United States Patent
Zhong et al.

(10) Patent No.: US 12,470,441 B2
(45) Date of Patent: *Nov. 11, 2025

(54) ANALOG CHANNEL EQUALIZATION AND CHANNEL ADAPTATION

(71) Applicant: Apple Inc., Cupertino, CA (US)

(72) Inventors: Lizhi Zhong, Sunnyvale, CA (US); Vishal Varma, Fremont, CA (US); Yu Chen, Santa Clara, CA (US); Wenyi Jin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,011

(22) Filed: Jan. 2, 2024

(65) Prior Publication Data
US 2024/0179034 A1 May 30, 2024

Related U.S. Application Data

(63) Continuation of application No. 17/804,476, filed on May 27, 2022, now Pat. No. 11,902,059.

(51) Int. Cl.
*H04L 25/03* (2006.01)
*H04B 1/10* (2006.01)

(52) U.S. Cl.
CPC ......... *H04L 25/03267* (2013.01); *H04B 1/10* (2013.01)

(58) Field of Classification Search
CPC ......... H04L 25/03019; H04L 25/03885; H04L 7/033; H04L 25/03267; H04L 25/03057; H04B 1/10
See application file for complete search history.

(56) References Cited

U.S. PATENT DOCUMENTS

| | | |
|---|---|---|
| 8,325,014 B1 | 12/2012 | Sundstrom et al. |
| 9,325,489 B2 | 4/2016 | Hsieh et al. |
| 9,736,790 B1 | 8/2017 | Haub et al. |
| 10,608,848 B1 | 3/2020 | Azenkot |
| 10,848,350 B1 | 11/2020 | Hossain et al. |
| 11,469,768 B2 | 10/2022 | Kushnir et al. |
| 11,489,657 B1 | 11/2022 | Lin et al. |
| 2009/0072865 A1* | 3/2009 | Bae ...................... H03K 5/1532 327/58 |
| 2013/0114663 A1* | 5/2013 | Ding ................. H04L 25/03038 375/230 |
| 2014/0064351 A1* | 3/2014 | Hidaka ................... H04L 27/01 375/232 |
| 2015/0381393 A1* | 12/2015 | Kotagiri ................ H04L 7/033 375/233 |
| 2021/0218604 A1* | 7/2021 | Wu ................... H04L 25/03885 |

\* cited by examiner

*Primary Examiner* — David S Huang
(74) *Attorney, Agent, or Firm* — Kowert, Hood, Munyon, Rankin & Goetzel, P.C.; Dean M. Munyon

(57) ABSTRACT

A receiver circuit including mechanisms for analog channel equalization and channel adaptation is disclosed. The receiver includes a front-end circuit configured to generate a filtered signal by performing filtering of an incoming signal that includes a stream of data symbols. A sample recovery circuit configured to sample an equalized signal, based on the filtered signal, to generate a plurality of recovered data symbols. A decision feedback equalization (DFE) circuit configured to generate the feedback signal based on the plurality of recovered data symbols. A logic circuit is configured to cause adjustment to one or more filters in the front-end circuit based on the plurality of recovered data symbols.

20 Claims, 11 Drawing Sheets

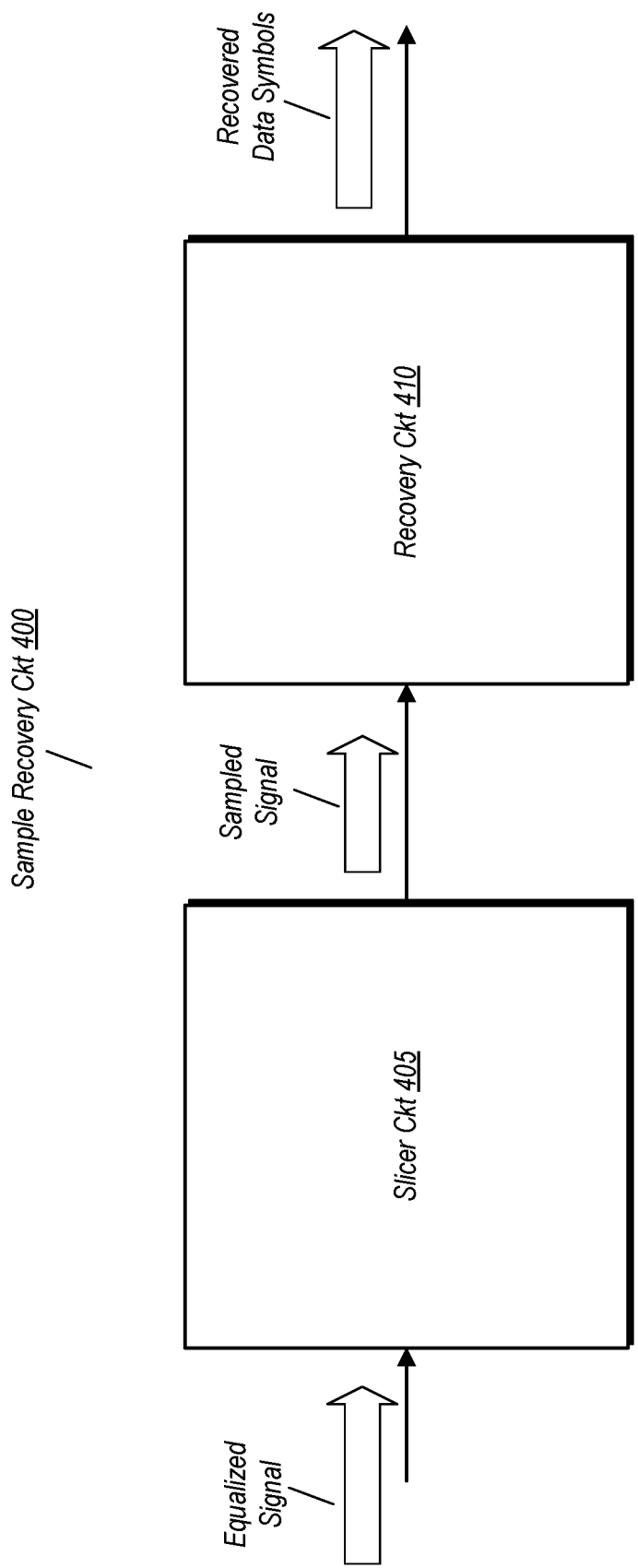

ANALOG CHANNEL EQUALIZATION AND CHANNEL ADAPTATION

PRIORITY CLAIM

The present application is a continuation of U.S. application Ser. No. 17/804,476, entitled "Analog Channel Equalization and Channel Adaptation," filed May 27, 2022, the disclosure of which is incorporated by reference herein in its entirety.

BACKGROUND

Technical Field

This disclosure is directed to communications systems, and more particularly, to circuits for receiving and transmitting information across a communications channel.

Description of the Related Art

High-speed communications systems are increasingly common in various devices. Such systems transmit data at high speeds across a communications link. Many such systems transmit data serially, although high-speed parallel communications system are used in many applications.

To ensure data is transferred correctly and without errors, various techniques are used. For example, decision feedback equalization is used to reduce distortion produced by inter-symbol interference (ISI) by evaluating a currently received symbol based on one or more previously received symbols. Many other techniques are utilized as well.

SUMMARY

A receiver circuit including mechanisms for analog channel equalization and channel adaptation is disclosed. In one embodiment, a receiver includes a front-end circuit configured to generate a filtered signal by performing filtering of an incoming signal that includes a stream of data symbols. In some embodiments, a summing circuit is configured to generate an equalized signal based on the filtered signal and a feedback signal, while a sample recovery circuit configured to sample the equalized signal to generate a plurality of recovered data symbols. Embodiments may also include a decision feedback equalization (DFE) circuit configured to generate the feedback signal based on the plurality of recovered data symbols. A logic circuit is configured to cause adjustment to one or more filters in the front-end circuit based on the plurality of recovered data symbols.

In various embodiments, the one or more filters of the front-end circuit include capacitors and resistors. These filters may be passive in some embodiments, but embodiments with active filters (e.g., including transistors) are also possible and contemplated. The logic circuit in one embodiment may be implemented with a finite state machine (FSM) which causes adjustment to the various capacitors and resistors of the filter. The FSM may utilize both the recovered data symbols as well as information from the DFE circuit (e.g., tap weights) as a basis for performing the adjustments.

BRIEF DESCRIPTION OF THE DRAWINGS

The following detailed description makes reference to the accompanying drawings, which are now briefly described.

FIG. 4 is a block diagram of one embodiment of a sample recovery circuit.

DETAILED DESCRIPTION OF EMBODIMENTS

The present disclosure is directed to adapting circuits in a receiver of a communications system to receive data in accordance with the electrical characteristics of a particular communications channel. In a communications system, the electrical characteristics of a channel can affect data in flight through the channel from the transmitter to the receiver. Some such system utilize a front-end circuit in the receiver known as a continuous time linear equalizer, or CTLE. A CTLE is a circuit that performs equalization on an incoming data signal, by amplifying certain frequency components of a signal and/or attenuating other frequency components. Other systems utilize decision feedback equalization, or DFE, to cancel distortion from inter-symbol interference (ISI) by using past received symbols in determining a correct value for a presently received symbol. CTLE and DFE are typically used separately from one another.

In an embodiment of the present disclosure, a receiver is disclosed in which information from a DFE circuit is used to determine the performance of a CTLE circuit with regard to adapting to a communications channel. Samples received by a sample recovery circuit are used to update the DFE and the CTLE circuit. The sample recovery circuit receives an equalized signal and recovers data symbols therefrom. These data symbols are provided to a DFE circuit and to a logic circuit that may, in various embodiments, include a finite state machine. The DFE circuit generates a feedback signal that is provided to a summing circuit coupled to the output of the CTLE circuit, where the summing circuit combines a filtered signal output from the CTLE with the feedback signal to produce an equalized signal that is input into the sample recovery circuit. The DFE circuit also provides tap weights to the finite state machine. Using the received information, the finite state machine may carry out a procedure to generate control signals used to adjust filters in the CTLE. As a result of this arrangement, the DFE circuit may reduce residual ISI in the equalized signal to a value small enough to effectively provide information as to how well the CTLE is performing. This may in turn allow the finite state machine to cause adjustments to the filters of the CTLE to improve performance, and thus increase overall system performance.

Various apparatus and method embodiments are now discussed in further detail. The discussion begins with a description of a receiver embodiment and embodiments of the various components thereof. A communications system utilizing an embodiment of the receiver disclosed herein is also described. Thereafter, flow diagrams illustrating various method embodiments are discussed, followed by a description of an example system in which the receiver may be implemented. A system for fabricating an integrated circuit upon which portions of the disclosed receiver may be implemented is also discussed.

Receiver Embodiment and Components Thereof

Figure 1:
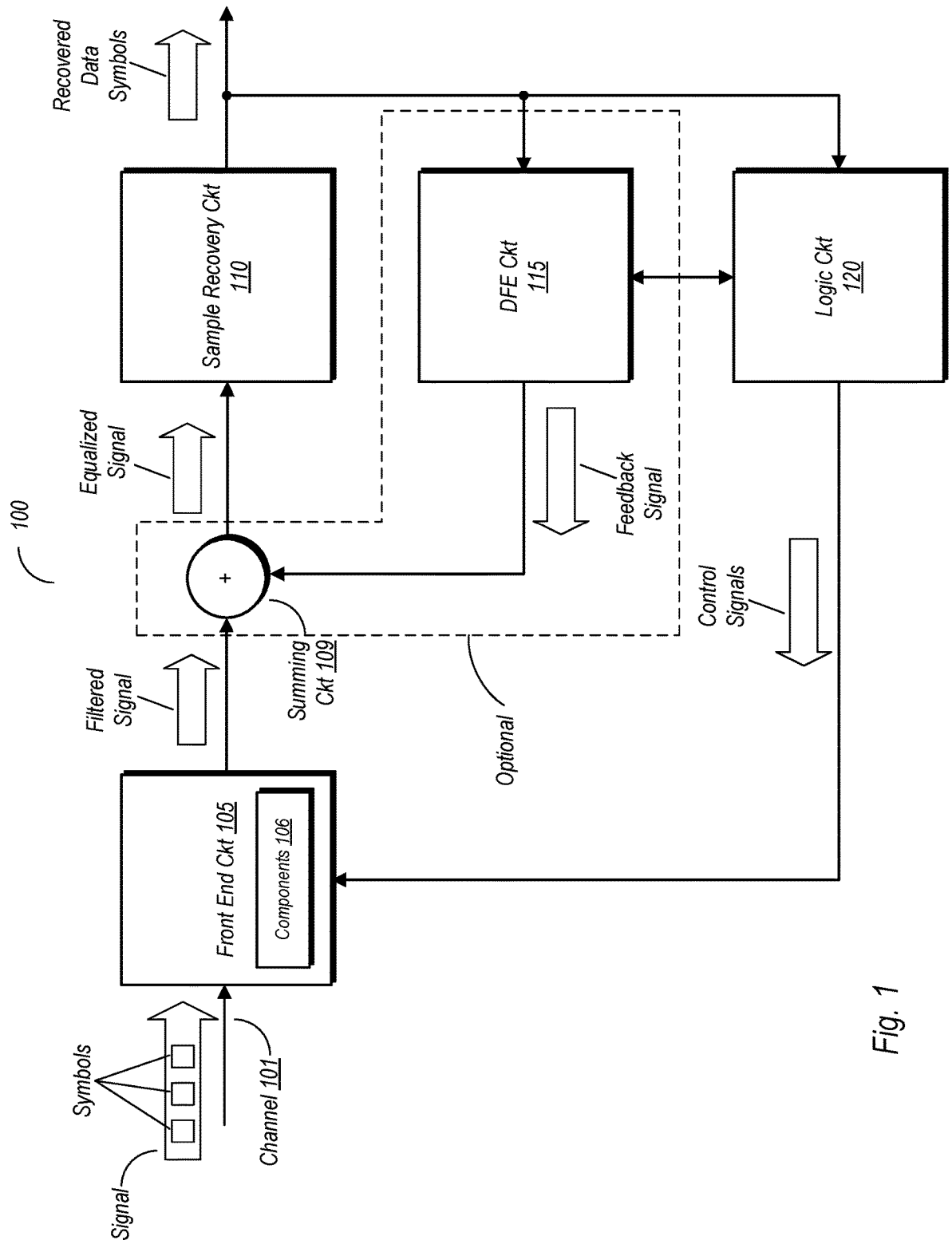
FIG. 1 is a block diagram of one embodiment of a receiver circuit.

FIG. 1 is a block diagram of a receiver that may be used in a communications system. In the embodiment shown, receiver 100 includes a front-end circuit 105 that is configured to receive, via channel 101, an incoming signal having a various symbols therein. The signal may be one transmitted according to a number of possible signaling protocols. For example, the incoming signal may be a pulse amplitude modulation (PAM) signal, such as PAM3 or PAM4, a non-return to zero (NRZ) signal, and so on. The incoming signal is received by the front-end circuit 105, that includes a number of components 106 (examples of which are discussed below). Among the functions performed by front-end circuit 105 is filtering. The, front-end circuit 105 outputs a filtered signal to summing circuit 109.

An optional summing circuit 109 in the embodiment shown is also coupled to receive a feedback signal, from DFE circuit 115, also optional. The summing circuit 109 and DFE circuit 115 may be used together in various embodiments, while embodiments not having a DFE circuit may be implemented without a corresponding summing circuit as well. Summing circuit 109 combines the filtered signal output from front-end circuit 105 with the feedback signal to produce an equalized signal. The equalized signal is received by sample recovery circuit 110. Sample recovery circuit 110 is configured to recover the data symbols embedded in the incoming signal. In some embodiments, sample recovery circuit 110 may implement a clock-and-data recovery (CDR) circuit that also recovers a clock signal embedded in the incoming signal.

The recovered data signals output from sample recovery circuit 110 may be provided to other circuit units (not shown) for post-processing. The recovered data symbols are also provided to DFE circuit 115 and logic circuit 120. DFE circuit 115 is configured to generate a feedback signal based on recovered data symbols. This feedback signal is used to equalize the filtered signal in order to generate the equalized signal that is provided to sample recovery circuit 110. DFE circuit 115 may be implemented in one of a number of different arrangements of DFE circuits, and may include a number of different taps to which weights are applied. The feedback signal, when combined with the filtered signal to produce the equalized signal, counteracts ISI that is present in the filtered signal output from front-end circuit 105.

Logic circuit 120 in the embodiment shown is configured to generate control signals based on the recovered data symbols, as well as information received from DFE circuit 115. For example, in one embodiment, DFE circuit 115 may provide tap weight information to logic circuit 120. Using the received information, logic circuit 120 generates control signals that are provided to front-end circuit 105 to adjust various ones of the components 106. In various embodiments, components 106 of front-end circuit may implement one or more filters, and may include components such as resistors and capacitors. The control signals generated by logic circuit 120 may be used to adjust resistances and capacitances of the various components in front-end circuit 105. More generally, the control signals may be used to adjust the frequency response of the one or more filters to perform filtering on the signal to remove some of the distortion that may be induced by ISI.

In one embodiment, logic circuit 120 includes a finite state machine that may implement a procedure for adjusting resistance and capacitance values of filters present in front-end circuit 105, which may implement a CTLE circuit. In some embodiments, the logic circuit 120 may receive and accumulate a certain number of symbols before carrying out the procedure to generate control signals to adjust the filters. In another embodiment, logic circuit 120 may carry out generation of the control signals on a periodic basis.

Generally speaking, logic circuit 120 and DFE circuit 115 may work in conjunction with one another to reduce distortion present in the incoming signal from ISI. The front-end circuit 120 may perform filtering/equalization of the incoming signal to remove some of the distortion due to ISI. The feedback signal generated by DFE circuit 115 may be used, when combined with the filtered signal, to remove some of the residual ISI present in the filtered signal as output from front-end circuit 105. The DFE circuit 115 thus effectively generates the feedback signal based on how well the front-end circuit 105 performs in removing ISI-based distortion.

Figure 2:
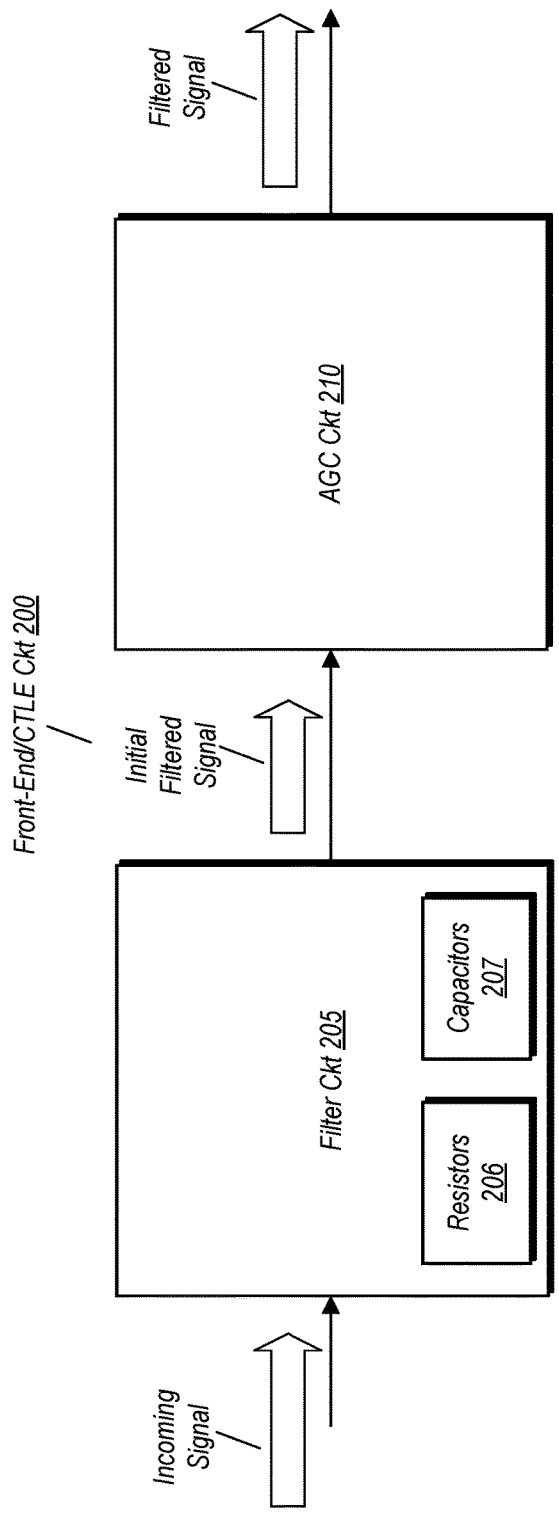
FIG. 2 is a block diagram of one embodiment of a front-end circuit utilized an embodiment of a receiver.

FIG. 2 is a block diagram of one embodiment of a front-end/CTLE circuit 200 that may be implemented as the front-end circuit 105 as shown in FIG. 1. In the embodiment shown, front-end/CTLE circuit 200 includes a filter circuit 205 that includes one or more resistors 206 and one or more capacitors 207. The filter circuit 205 may perform filtering on the incoming signal to attenuated undesired frequency components. The implementation of the filters may vary from one embodiment to the next, and may be passive, active, or a combination of the two. Examples of possible filters are discussed below in reference to FIGS. 3A and 3B.

The output from filter circuit 205 is an initial filtered signal that is provided to automatic gain control (AGC) circuit 210. In the embodiment shown, AGC circuit 210 may be implemented as an amplifier or as an attenuator. Generally speaking, AGC circuit 210 may be implemented to maintain amplitude of the initial filtered signal, outputting the filtered signal that is provided to a summing circuit, such as summing circuit 109.

Figure 3B:
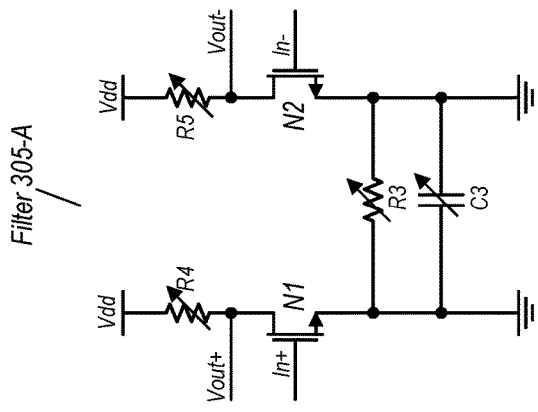
FIG. 3B is a schematic diagram of another embodiment of a filter implemented in an embodiment of a front-end circuit.
Figure 3A:
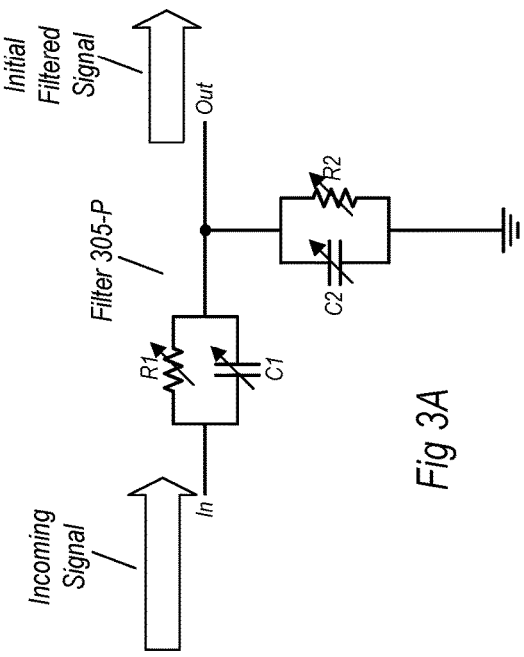
FIG. 3A is a schematic diagram of one embodiment of a filter implemented in an embodiment of a front-end circuit.

FIG. 3A is a schematic diagram of one embodiment of a passive filter that may be implemented in filter circuit 205. In the embodiment shown, filter 305-P is a passive filter. The incoming signal is received by filter 305-P on an input terminal (In), with the initial filtered signal being provided from the output terminal (Out). Filter 305-PO includes variable resistors R1 and R2 and variable capacitors C1 and C2. More generally, these resistors and capacitors may represent various resistances and capacitances implemented in the filter, and may be implemented in various ways. For example, the capacitances may be implemented using a bank of selectable capacitors. The resistances and capacitances may be adjusted by control signals conveyed from a logic circuit/FSM, such as logic circuit 120 of FIG. 1. Adjusting the resistances and capacitances may affect the filter characteristics, and may thus be carried out to perform equalization on the incoming signal.

FIG. 3B is a schematic diagram of another embodiment of a filter that may be implemented in filter circuit 205. In this embodiment, filter 305-A is an active filter that includes resistors R3-R5 and capacitor C3, as well as transistors N1 and N2. As with the embodiment discussed above, the resistors and capacitors are variable, with their respective values being adjustable by control signals from, e.g., logic circuit 120 of FIG. 1. In this particular embodiment, the incoming signal is received as a differential signal, with true and complementary components provided to the gate terminals of transistors N1 and N2, respectively. Similarly, the output signal in this embodiment is provided as a differential signal, with the true and complementary components provided from the drain terminals of N1 and N2, respectively.

It is noted that the filter embodiments illustrated in FIGS. 3A and 3B are provided by way of example, and are not intended to be limiting. In various embodiments, the one or more filters of filter circuit 205 may be implemented in a wide variety of configurations. The various configurations may be passive, active, or some combination of the two, and may includes resistances and capacitance implemented in various arrangements. Furthermore, the filters may be implemented as high-pass, low-pass, or band-pass filters.

FIG. 4 is a block diagram of one embodiment of a sample recovery circuit. In the embodiment shown, sample recovery circuit 400 includes a slicer circuit 405 and a recovery circuit 410. Slicer circuit 405 in the embodiment shown is configured to distinguish voltage levels in the equalized signal from one another. Depending on the type of signaling (e.g., PAM4, PAM3, NRZ, etc.), slicer circuit 405 may carry out comparisons to determine the voltage of the equalized signal, and thus determine the logic values of the symbols implemented therein.

Recovery circuit 410 may receive the sampled signal and carry out various functions. In one embodiment, recovery circuit 410 includes a clock-and-data recovery (CDR) circuit configured to interpret the symbols and recover a clock signal that is embedded in the sampled signal. Recovery circuit 410 may also include, in various embodiments, decoder circuitry. For example, in a communications system utilizing 8b/10b encoding for transmissions, corresponding 8b/10b decoders may be implemented in recovery circuit 410 to enable recovery of the original data prior to encoding on the transmit side of the communications channel. Using the various circuits implemented therein, recovery circuit 410 is configured to output the recovered data symbols, which are conveyed to other functional circuits for, e.g., post-processing.

In various embodiments, recovery circuit 410 outputs the recovered symbols as a serial stream. However, embodiments in which recovery circuit 410 implements a deserializer portion of a SERDES (serializer-deserializer) are possible and contemplated, and thus the various logic values within the recovered symbols may be output as parallel data.

Figure 5:
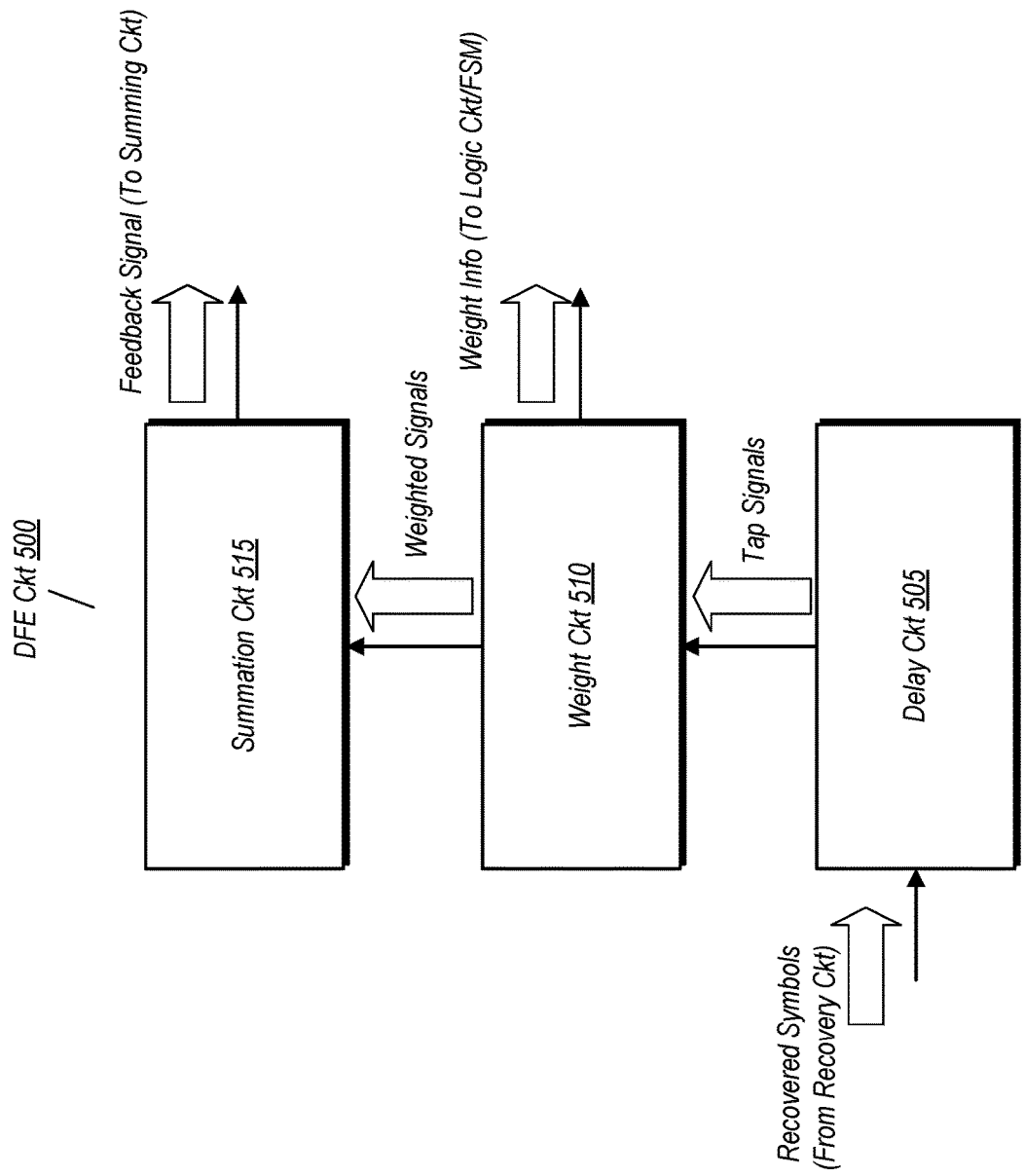
FIG. 5 is a block diagram of one embodiment of a DFE circuit utilized an embodiment of a receiver.

FIG. 5 is a block diagram of one embodiment of a DFE circuit. In the embodiment shown, DFE circuit 500 includes a delay circuit 505, a weight circuit 510, and a summation circuit 515. DFE circuit 500 is configured to receive as an input recovered symbols from a recovery circuit (e.g., sample recovery circuit 110 of FIG. 1) and provide as outputs a feedback signal and weight information. The feedback signal is provided from summation circuit 515 to a summing circuit (e.g., summing circuit 109 of FIG. 1) for combining with the filtered signal to generate an equalized signal. Weight information is output from weight 510 to a logic circuit/finite state machine (e.g., logic circuit 120 of FIG. 1) for use in generating control signals to a front end/CTLE circuit.

Delay circuit 505 in the embodiment shown includes a number of delay elements (not shown here). The delay elements may serially coupled to one another. A tap may be associated with each delay element, with a tap on the initial input (coupled to receive the symbols as they arrive) and a tap on the final output. Symbols received by delay circuit 505 propagate through the serially-coupled delay elements, with a signal being generated at each tap based on the most recent symbol to have propagated through the most recent delay element. Delay circuit 505 may thus, in various embodiments, implement a filter structure that subtracts ISI from past decisions used to determine the value of incoming symbols.

The tap signals are provided to weight circuit 510. Using weight circuit 510, each of the tap signals is assigned a weighting value. The weighting values may be assigned according to coefficients that may be set and/or adjusted based on certain channel characteristics. Since the channel characteristics may change over time due to various factors such as temperature, the coefficients may also change in various embodiments. The tap signals are combined with the coefficients to generate weighted signals. The weighted signals in the embodiment shown are provided to summation circuit 515, which may operate to combine these signals into one or more feedback signals. The feedback signal(s) are then provided to the summing circuit (e.g., summing circuit 109 of FIG. 1) to equalize a filtered circuit output from a front-end/CTLE circuit. Additionally, weighting information, such as the tap coefficients, may be provide by weight circuit 510 to a logic circuit/FSM that generates control signals for the front-end/CTLE circuit.

Figure 6:
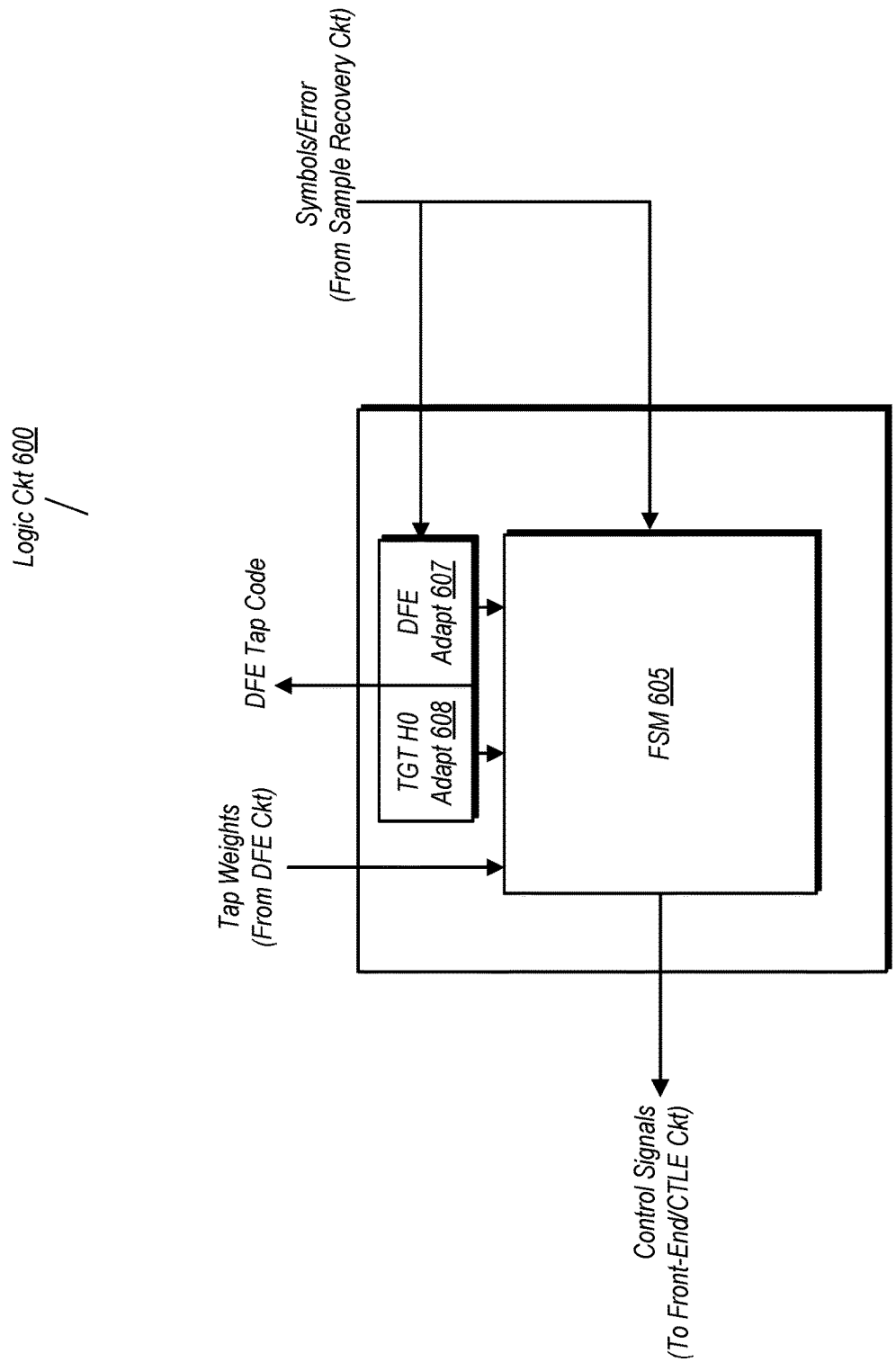
FIG. 6 is a block diagram of one embodiment of a logic circuit utilized an embodiment of a receiver.
Figure 9A:
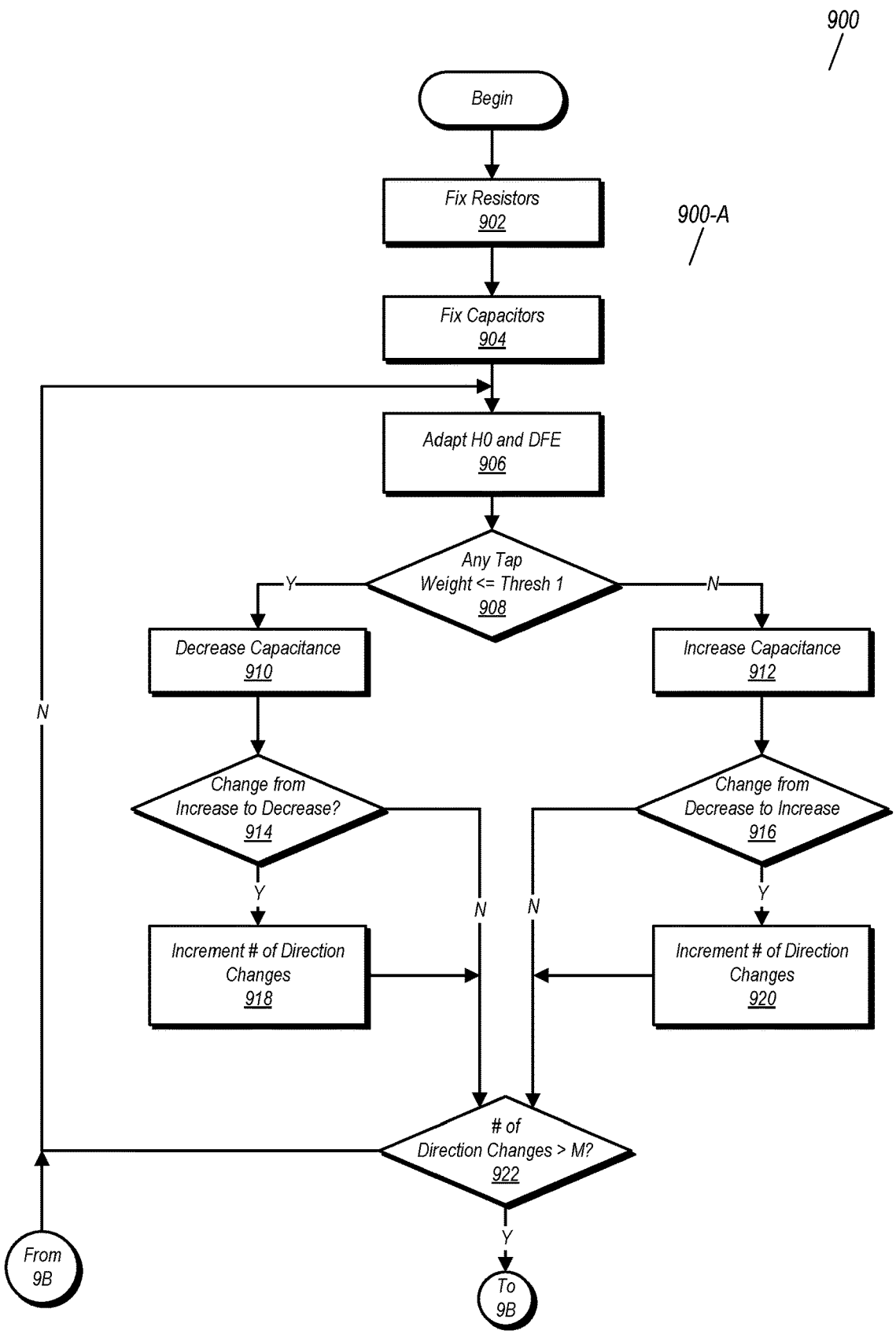
FIGS. 9A and 9B illustrate respective portions of a flow diagram for a method for operating a receiver.
Figure 9B:
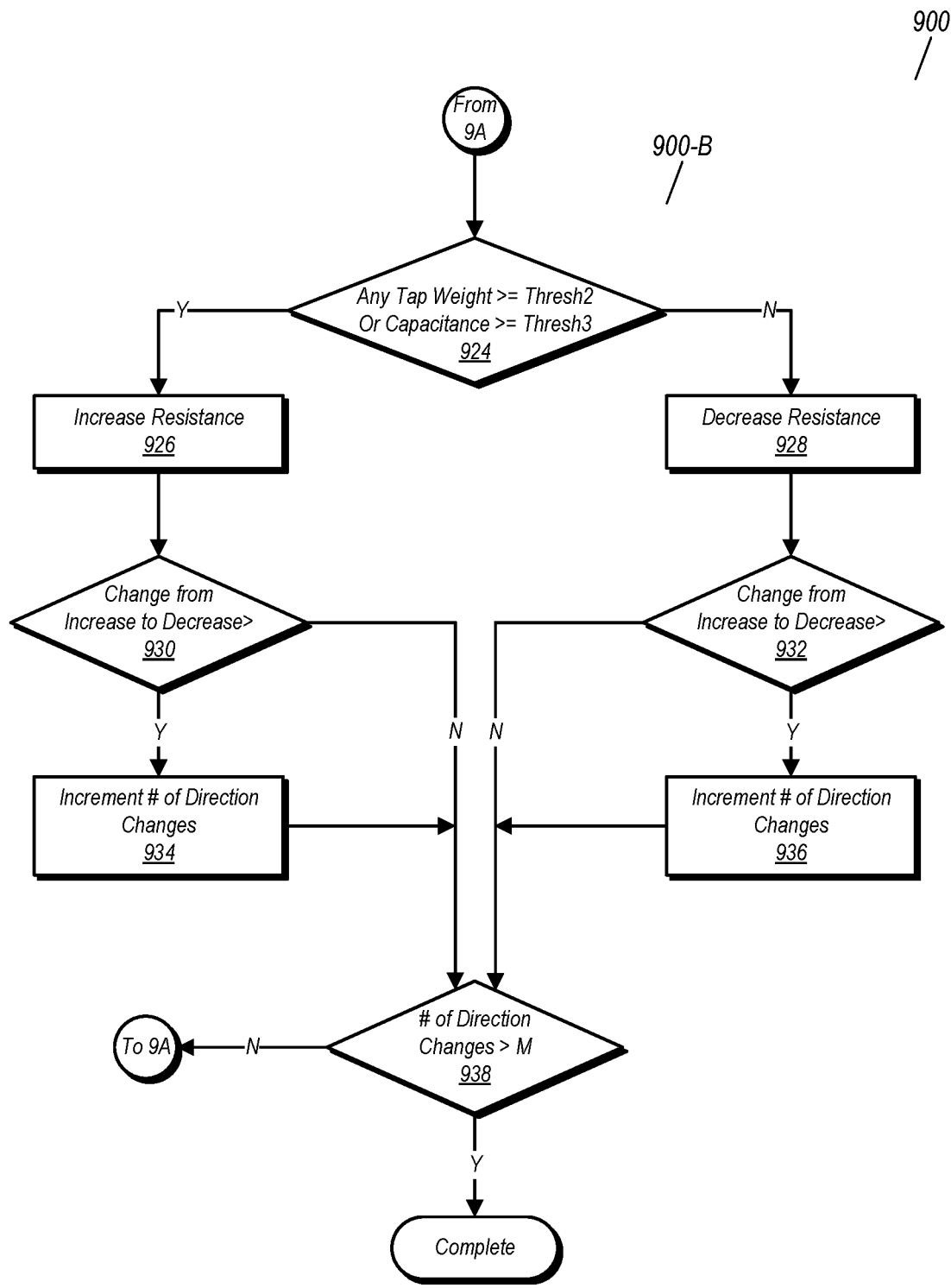

FIG. 6 is a block diagram of one embodiment of a logic circuit 600 that may be implemented in an embodiment of a receiver, such as that shown in FIG. 1. In the embodiment shown, logic circuit 600 includes sequential logic circuitry to implement a finite state machine (FSM) 605. Additional circuitry, such as circuitry for generating a clock to synchronize operations of the FSM, comparators for carrying out comparison operations, and so on, may also be included in logic circuit 600. Logic circuit 600 may operate using tap weight information received from a DFE circuit and symbols received from a sample recovery circuit, such as those illustrated in FIG. 1. Using the received information, FSM 605 may carry out a method to generate control signals for, e.g., adjusting the characteristics of one or more filters implemented in a front-end/CTLE circuit. One embodiment of a method that may be carried out by FSM 605 is illustrated in FIGS. 9A and 9B, and will be discussed in further detail below.

Although not explicitly shown here, logic circuit 600 in the embodiment shown may include a timer circuit and/or a buffer used to store symbols. In some embodiment, the method carried out by FSM 605 may be performed on a periodic basis, in accordance with a period set by a timer circuit. In another embodiment, the method carried out by FSM 605 may be performed after a certain number of symbols have been accumulated in the buffer circuit.

Logic circuit 600 in the embodiment shown also includes DFE adaption circuit 607 in the embodiment shown. DFE adaption circuit 607 is arranged to receive both recovered data symbols and error symbols from, e.g., sample recovery circuit 110 of FIG. 1A. Using these inputs, DFE adaption circuit 607 may conduct a least mean squares (LMS) algorithm to generate a tap code that is provided to a DFE circuit, such as DFE circuit 115 of FIG. 1A. The DFE circuit may then generate tap weights based at least in part on the received tap code. Logic circuit 600 also includes a target H0 adapter circuit, which may determine an average signal amplitude for DFE adaption.

Figure 7:
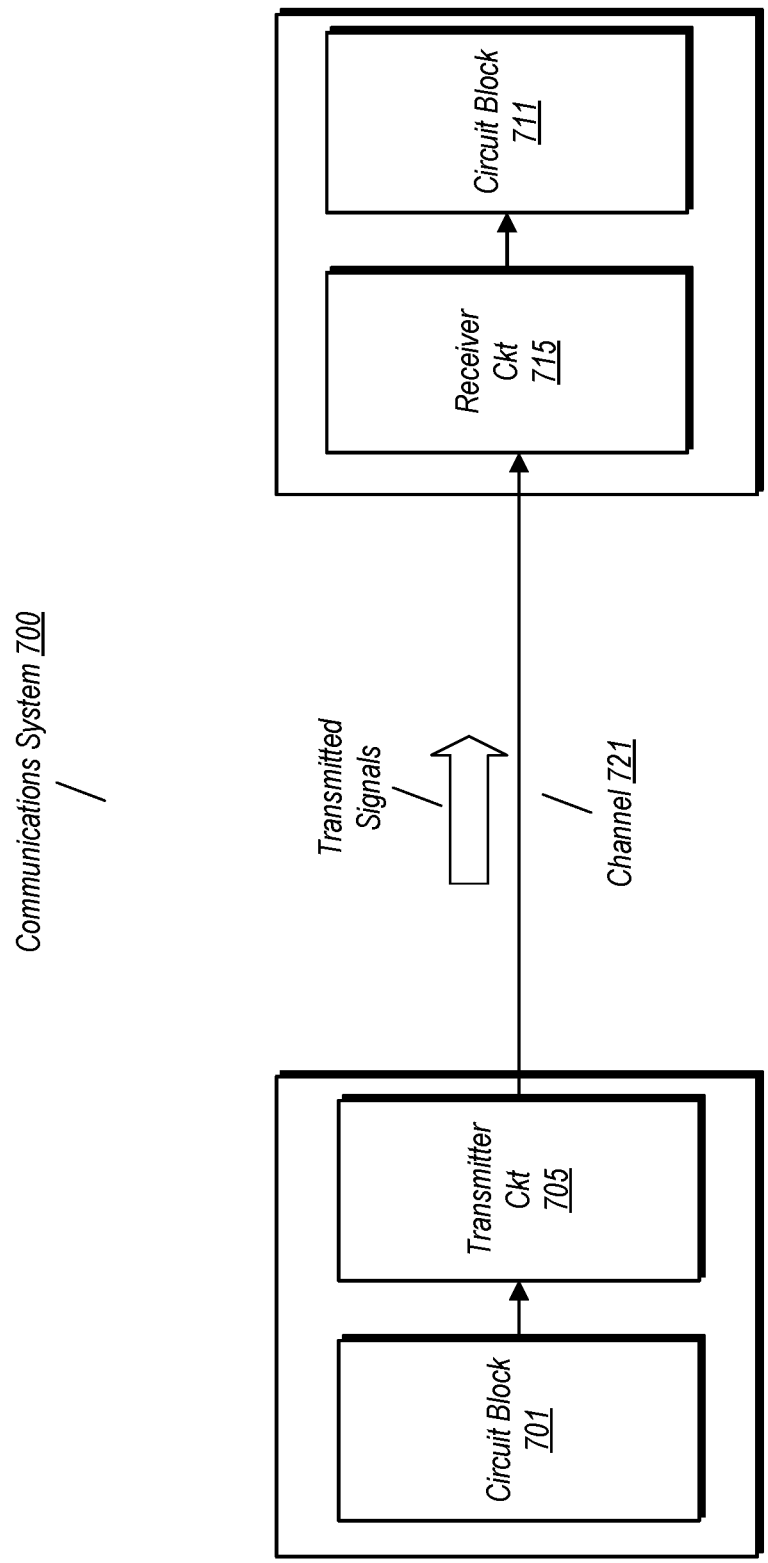
FIG. 7 is a block diagram of one embodiment of communications system.

Communications System:

FIG. 7 is a block diagram of one embodiment of a communications system. In the embodiment shown, a transmit side comprising circuit block 701 and transmitter circuit 705 is connected via channel 721 to a receiver circuit 715 and a circuit block 711. In one embodiment, channel 721 may be a wired channel configured for high-speed transmission of serial data. Embodiments in which both sides of the channel include transmit and receiver circuitry are possible and contemplated as well. In various embodiments, the components shown here may be in different systems that may be connected to one another. For example, one side of the communications system 700 may be implemented in a smart phone while the other side may be implemented in a peripheral device, with the channel implemented at least in part by a cable used to coupled such systems together.

Circuit block 701 in the embodiment shown may include processing circuitry that performs various actions such as formatting data to be transmitted. The data may then be forwarded to transmitter circuit 705. In some embodiments, additional formatting, such as encoding, may be performed in transmitter circuit 705. In some embodiments, in which communications system 700 is a SERDES system, transmitter circuit 705 may serialize the received data. Transmitter 705 also includes transmitter circuitry configured to amplify signals for transmission.

Receiver circuit 715 in the embodiment shown may be an embodiment of the receiver circuit discussed above with reference to FIG. 1, and may include various ones of the different component embodiments as discussed in reference to FIGS. 2-6. More generally, receiver circuit 715 may be any embodiment of a receiver that carries out the various ones of the operations described herein. Receiver circuit 715 may include a front-end/CTLE circuit, and may also include a DFE circuit, which may work in conjunction with one another to reduce the amount of ISI within incoming signals and adapt the receiver to current channel conditions. Receiver 715 may also perform other functions, such as clock and data recovery, decoding, and so on.

Circuit block 711 in the embodiment shown may receive the recovered data from receiver 715. Circuit block 711 may perform various functions and post-processing on the data received from receiver 715. For example, circuit block 711 may perform data formatting for use by other circuits or for output to a user of the particular system in which it is implemented. More generally, circuit block 711 may be any circuitry in which the received data is used or is prepared for its final use.

Method Embodiments

Figure 8:
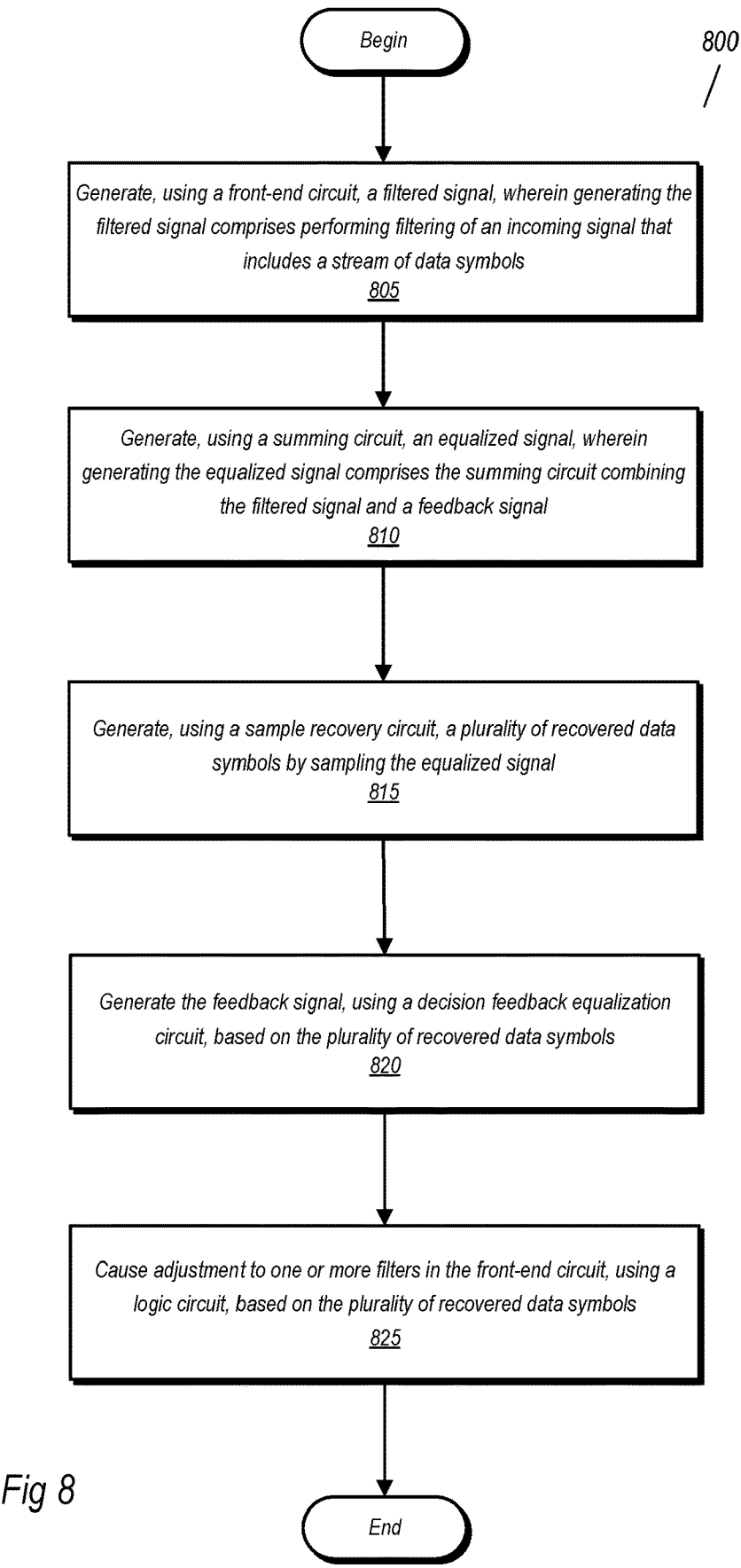
FIG. 8 is a flow diagram of one embodiment of a method for operating a receiver.

FIG. 8 is a flow diagram of one embodiment of a method for operating a receiver. Various embodiments of Method 800 may be carried out by various embodiments of the receiver disclosed herein. Embodiments of a receiver capable of carrying out Method 800 but not explicitly disclosed herein are also considered to fall within the scope of this disclosure.

Method 800 includes generating, using a front-end circuit, a filtered signal, wherein generating the filtered signal comprises performing filtering of an incoming signal that includes a stream of data symbols (block 805). The method further includes generating, using a summing circuit, an equalized signal, wherein generating the equalized signal comprises the summing circuit combining the filtered signal and a feedback signal (block 810). Thereafter, the method includes generating, using a sample recovery circuit, a plurality of recovered data symbols by sampling the equalized signal (block 815). The method also includes generating the feedback signal, using a decision feedback equalization circuit, based on the plurality of recovered data symbols (block 820) and causing adjustment to one or more filters in the front-end circuit, using a logic circuit, based on the plurality of recovered data symbols (block 825).

In various embodiments of a receiver, the logic circuit comprises a finite state machine. Accordingly, some embodiments of the method include the finite state machine generating control signals to cause adjustment to one or more resistances and one or more capacitances in the filters of the front-end circuit. Embodiments may also include providing, from the DFE circuit to the finite state machine, information regarding inter-symbol interference present in the equalized signal, wherein the information regarding inter-symbol interference comprises tap weights in one or more taps of the DFE circuit. Based on the information regarding the inter-symbol interferences, embodiments of the method may also include adjusting the one or more resistances and the one or more capacitances. In adjusting the resistances and the capacitance, embodiments of the method include changing a direction of adjustment for the one or more resistances a predetermined number of times and changing a direction of adjustment for the one or more capacitances a predetermined number of times.

FIGS. 9A and 9B illustrate respective portions of a flow diagram for a method for operating a receiver. FIG. 9A illustrates an inner loop 900-A of a Method 900, while FIG. 8B illustrates an outer loop 900-B of Method 900. In the inner loop, the adjustment of the capacitance may change the AC gain in the front-end/CTLE circuit.

In various embodiments, Method 900 may be carried out by, e.g., an FSM such as that shown in FIG. 6 and as implemented in a logic circuit of, e.g., FIG. 1. However, this is not intended to limit the various mechanisms that can carry out Method 900. Furthermore, any mechanism which is capable of carrying out Method 900 is considered to fall within the scope of this disclosure. Generally speaking, Method 900 is a method for generating control signals to adjust resistances and capacitances of filters implemented in a front-end/CTLE circuit of a receiver.

Loop 900-A of Method 900 begins with the fixing of resistors (or more generally, resistances) at a particular value (block 902) and the fixing of capacitors (or more generally capacitances) at a starting value (block 904). In this particular embodiment, the communications system utilizes even and odd modes of propagation of signals in the channel, and thus Method 900 includes the even and odd offsets. The method continues after block 904 with the adapting of the DFE and the signal amplitude H0 (block 906), as further described in the following method steps.

Utilizing information regarding tap weights received from a DFE circuit, a check is made to determine if any of the tap weights exceed a first threshold, Thresh 1 (block 908). If any of the tap weights exceed a threshold (block 908, yes), the capacitance is decreased (block 910) by reducing the capacitance provided by one or more variable capacitors or reducing the capacitance of a particular capacitor bank. The threshold may be a static threshold or a dynamic threshold that is updated based on previous, e.g., previous tap weight values. Furthermore, the threshold values may be programmable. A check is then made to determine if the change of capacitance from a previous iteration (if any) was from an increase of capacitance to a decrease (block 914). If the change was not from an increase to a decrease (block 914, no), the method proceeds to block 922. If the change is from an increase to a decrease (block 914, yes), then the number of direction changes is incremented (block 918). The incrementing may be performed by a counter or other mechanism for tracking a number of direction changes.

If none of the tap weights are greater than the first threshold, Thresh 1 (block 908, No), the capacitance of the filter(s) in the front-end/CTLE circuit is increased (block 912). If the increase represents a change from a previous decrease to an increase (block 916, yes), the number of direction changes is incremented, and the method proceeds to block 922. Otherwise, if the change does not represent a change from a decrease to an increase (block 916, no), the method proceeds to block 922 without any incrementing being performed.

If the number of direction changes is not greater than an integer value M (block 922, no), Method 900 returns to block 906, and the inner loop between block 906 and block 922 is repeated. If the number of direction changes is greater than M (block 922, yes), Method 900 proceeds to block 924 of FIG. 9B, which begins the outer loop.

At block 924, if any tap weight is greater than or equal to a second threshold, Thresh2, or the capacitance is greater than or equal to a capacitance threshold, Thresh 3 (block 924, yes) the resistance in the filters is increased (block 926). If the resistance adjustment represents a change from an increase to a decrease (block 930, yes), the number of direction changes is incremented (block 934), and the method then proceeds to block 938. If the adjustment is not a change from an increase to a decrease (block 930, no), the method proceeds to block 938 without incrementing.

If one or more of the tap weights is not greater than or equal to Thresh 2, or the capacitance is not greater than or equal to Thresh 3 (block 924, no), the resistance of the filters is decreased (block 928). If the decrease in the resistance represents a change from an increase (block 932, yes), the number of direction changes is incremented (block 936) and the method proceeds to block 938. If the decrease does not result in a change in direction (block 932, No), the method proceeds to block 938 without incrementing.

If the number of direction changes is less than a value M (block 938, No), then Method 900 returns to FIG. 9A, at block 406, and the inner loop is repeated. If the number of direction changes is greater than M (block 938, yes), Method 900 is complete.

As noted above, this method may be carried out by an FSM implemented in a logic circuit such as that shown in FIG. 1. However, the disclosure is not limited in this manner, and embodiments are contemplated in which other types of processing circuitry (e.g., a programmable gate array, a processor executing instructions, etc.) carries out Method 900 to adjust the filter characteristics of a front-end/CTLE circuit.

Example System

Figure 10:
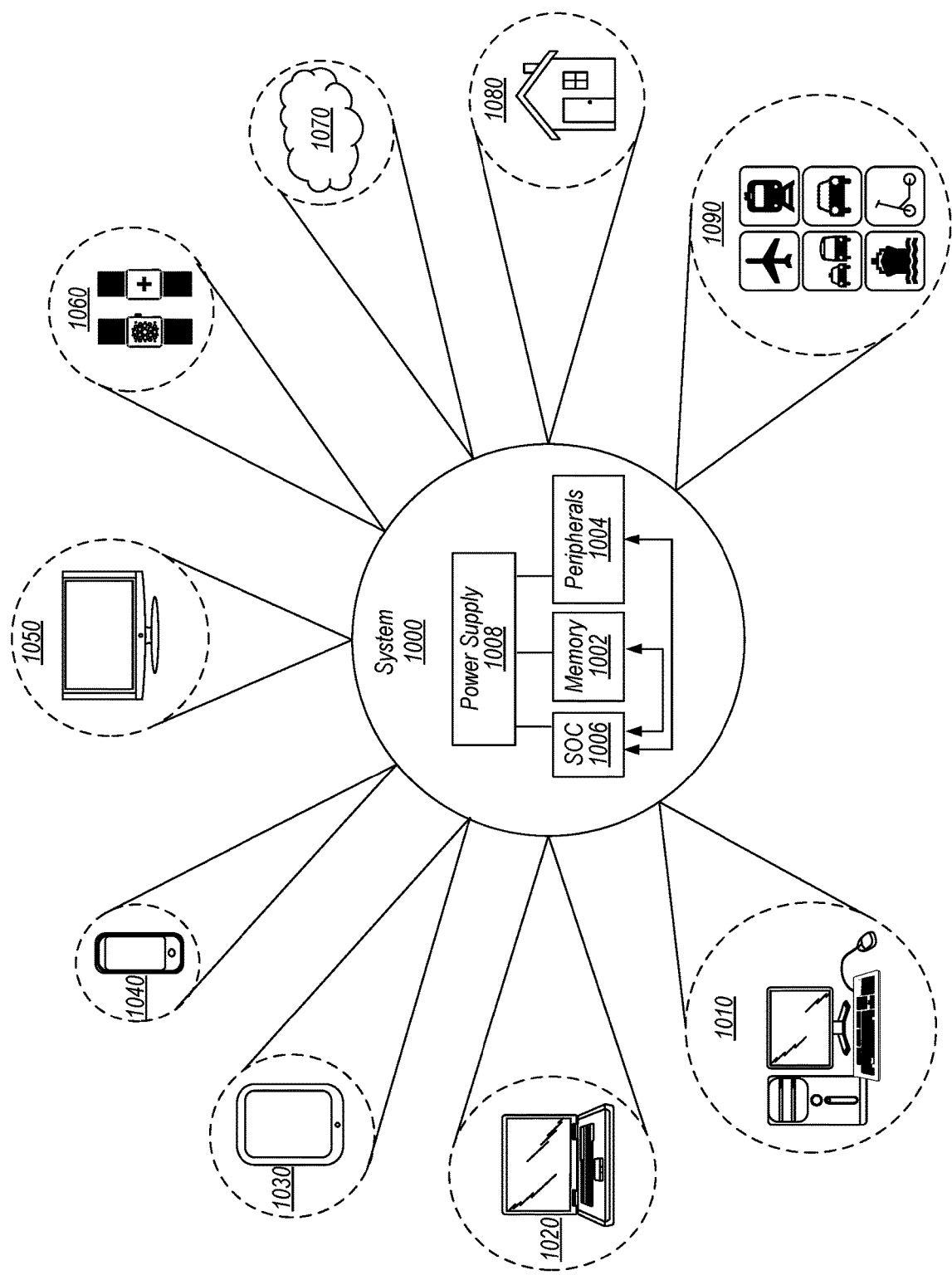
FIG. 10 is a block diagram of one embodiment of an example system.

Turning next to FIG. 10, a block diagram of one embodiment of a system 1000 is shown that may incorporate and/or otherwise utilize the methods and mechanisms described herein. In the illustrated embodiment, the system 1000 includes at least one instance of a system on chip (SoC) 1006 which may include multiple types of processing units, such as a central processing unit (CPU), a graphics processing unit (GPU), or otherwise, a communication fabric, and interfaces to memories and input/output devices. In some embodiments, one or more processors in SoC 1006 includes multiple execution lanes and an instruction issue queue. In various embodiments, SoC 1006 is coupled to external memory 1002, peripherals 1004, and power supply 1008.

A power supply 1008 is also provided which supplies the supply voltages to SoC 1006 as well as one or more supply voltages to the memory 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory 1002 is included as well).

The memory 1002 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

System 1000 in the embodiment may implement a number of different communications system and components thereof. Accordingly, various embodiments of system 1000 include a receiver as discussed in various ones of FIGS. 1-9. The receiver may be part of a complete communications system implemented within system 1000 (e.g., one that also includes a transmitter and a full communications channel. Embodiments are also possible and contemplated in which the receiver is part of a communications system in which the transmitter is implemented outside of system 1000 (e.g., in a peripheral device not shown in FIG. 10).

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, smartwatch 1060 may include a variety of general-purpose computing related functions. For example, smartwatch 1060 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These any many other embodiments are possible and are contemplated. It is noted that the devices and applications illustrated in FIG. 10 are illustrative only and are not intended to be limiting. Other devices are possible and are contemplated.

It is noted that while the circuits discussed may be implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

Figure 11:
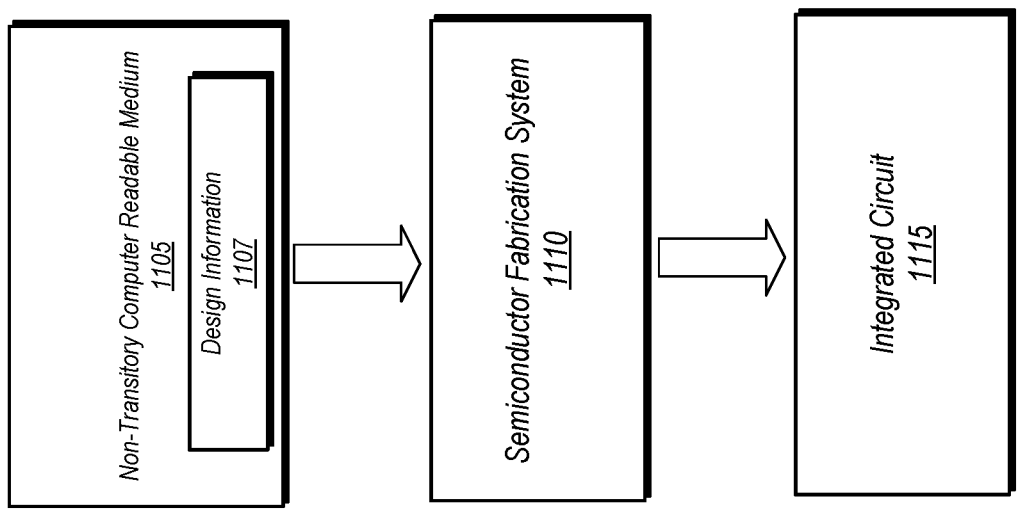
FIG. 11 is a block diagram of one embodiment of a system for fabricating an integrated circuit.

Integrated Circuit Manufacturing System:

FIG. 11 is a block diagram of one embodiment of a system for fabricating an integrated circuit. In the embodiment shown, design information 1107 regard an integrated circuit is stored on a non-transitory computer readable medium (e.g., flash memory, hard disk storage, solid state drive, optical disk, etc.). The integrated circuit described in the design information 1107 may include a receiver as disclosed herein. The design information 1107 may be conveyed to semiconductor fabrication system 1110. Using the design information 1107, semiconductor fabrication system 1110 may carry out operations to manufacture integrated circuit 1115.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured to" perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a front-end circuit comprising a plurality of analog circuit components, wherein the plurality of analog circuit components are configured to modify, based on one or more control signals received by the front-end circuit, a frequency component of an input signal to generate a filtered signal;
a summing circuit configured to generate an equalized signal by combining the filtered signal with a feedback signal;
a sample recovery circuit configured to generate, using the equalized signal, a plurality of recovered data symbols; and
a logic circuit configured to generate, based on the plurality of recovered data symbols and based on weight information, the one or more control signals, wherein the logic circuit is further configured to receive the weight information from a decision feedback equalization (DFE) circuit, the weight information including weighted values applied to tap signals generated by the DFE circuit from the plurality of recovered data symbols.

2. The apparatus of claim 1, wherein the front-end circuit includes at least one filter circuit incorporating respective ones of the plurality of analog circuit components, and wherein the logic circuit is configured to adjust, using the control signals, a frequency response of the at least one filter circuit.

3. The apparatus of claim 2, wherein the plurality of analog circuit components includes one or more variable resistors and one or more variable capacitors, wherein, to adjust the frequency response of the at least one filter circuit, the logic circuit is configured to adjust, using the one or more control signals, respective values of the one or more variable resistors and the one or more variable capacitors.

4. The apparatus of claim 2, wherein the at least one filter circuit includes one or more active components.

5. The apparatus of claim 1, wherein the front-end circuit further includes an automatic gain control circuit configured to modify an amplitude of the filtered signal.

6. The apparatus of claim 1, further comprising the DFE circuit configured to:
generate the feedback signal using the plurality of recovered data symbols; and
generate the weight information, wherein, to generate the weight information the DFE circuit is configured to assign weighting values to tap signals generated by a delay circuit of the DFE circuit.

7. The apparatus of claim 1, wherein the logic circuit includes a finite state machine (FSM) circuit, wherein the DFE circuit is further configured to provide information regarding residual inter-symbol interference present in the equalized signal to the finite state machine, and wherein the finite state machine is configured to, based on the information regarding the residual inter-symbol interference, use the one or more control signals to adjust the one or more frequency components of the input signal by adjusting respective ones of the plurality of analog circuit components.

8. The apparatus of claim 7, wherein the logic circuit includes a DFE adaption circuit configured to generate, using the plurality of recovered data symbols and one or more error symbols, a DFE tap code, wherein the DFE circuit is configured to generate the weight information using the DFE tap code.

9. The apparatus of claim 1, wherein the DFE circuit includes:
a delay circuit configured to generate, using the plurality of recovered data symbols, a plurality of tap signals;
a weight circuit configured to combine the plurality of tap signals with respective ones of a plurality of coefficients to generate a plurality of weighted signals corresponding to the weight information; and
a summation circuit configured to generate the feedback signal by combining the plurality of weighted signals.

10. The apparatus of claim 1, wherein the sample recovery circuit includes:
a slicer circuit configured generated a sampled signal, wherein to generate the sampled signal, the slicer circuit is configured to perform at least one comparison to determine a voltage level of the equalized signal; and
a recovery circuit configured to recover a clock signal embedded in the sampled signal and further configured to perform a decode operation to generate the plurality of recovered data symbols.

11. A method comprising:
receiving, at a front-end circuit, an input signal;
modifying, at a plurality of analog circuit components of the front-end circuit and based on one or more control signals, one or more frequency components of the input signal to generate a filtered signal;
generating, at a summing circuit, an equalized signal, wherein generating the equalized signal comprises combining the filtered signal with a feedback signal;
generating, at a sample recovering circuit and based on the equalized signal, a plurality of recovered data symbols; and
generating, at a logic circuit based on the plurality of recovered data symbols and based on weight information, the one or more control signals, wherein generating the one or more control signals includes receiving, at the logic circuit, the weight information from a decision feedback equalization (DFE) circuit, the weight information including weighted values applied to tap signals generated by the DFE circuit from the plurality of recovered data symbols.

12. The method of claim 11, wherein the modifying one or more frequency components of the input signal comprises the logic circuit adjusting, using the control signals, a frequency response of at least one filter circuit of the front-end circuit.

13. The method of claim 12, wherein adjusting the frequency response of the at least one filter circuit comprises adjusting respective values of one or more variable resistors and one or more variable capacitors.

14. The method of claim 11, further comprising modifying, using an automatic gain control circuit, an amplitude of the filtered signal.

15. The method of claim 11, further comprising generating the feedback signal and the weight information at the DFE circuit.

16. The method of claim 11, further comprising:
providing, from the DFE circuit to a finite state machine of the logic circuit, information indicating residual inter-symbol interference present in the equalized signal;
generating, using the finite state machine, the one or more control signals based further on the information indicating the residual inter-symbol interference present in the equalized signal; and
generating, using a DFE adaption circuit, the plurality of recovered data symbols, and one or more error symbols, a DFE tap code.

17. The method of claim 11, further comprising generating the feedback signal at the DFE circuit, wherein generating the feedback signal comprises:
generating, using a delay circuit and the plurality of recovered data symbols, a plurality of tap signals;
generating, using a weight circuit, a plurality of weighted signals by combining the plurality of tap signals with respective ones of a plurality of coefficients; and
generating, using a summation circuit, the feedback signal by combining the plurality of weighted signals corresponding to the weight information.

18. A system comprising:
an analog front-end circuit including one or more filter circuits, wherein the analog front-end circuit is configured to generate a filtered signal using the one or more filter circuits and a plurality of control signals to modify frequency components of an input signal;
a summing circuit configured to combine the filtered signal with a feedback signal to generate an equalized signal;
a sample recovery circuit configured to recover a plurality of data symbols from the equalized signal and further configured to recover a clock signal embedded in the equalized signal;
a decision feedback equalization (DFE) circuit configured to generate the feedback signal using the plurality of data symbols; and
a finite state machine configured to generate the plurality of control signals using the plurality of data symbols and information indicative of residual inter-symbol interference in the equalized signal.

19. The system of claim 18, wherein a given filter circuit of the one or more filter circuits includes one or more variable resistors and one or more variable capacitors, and wherein, to modify the frequency components of an input signal, the finite state machine is configured to use the plurality of control signals to change a value of at least one of the one or more variable resistors and one or more variable capacitors.

20. The system of claim 19, wherein the given filter circuit includes one or more active components.

\* \* \* \* \*